US009906575B2

(12) United States Patent
Farrell et al.

(10) Patent No.: US 9,906,575 B2
(45) Date of Patent: Feb. 27, 2018

(54) MEDIA FLING SYSTEM

(71) Applicant: Comcast Cable Communications, LLC, Philadelphia, PA (US)

(72) Inventors: Corey Farrell, Lansdowne, VA (US); Randall Hounsell, Glen Mills, VA (US); Michael Connelly, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 14/461,207

(22) Filed: Aug. 15, 2014

(65) Prior Publication Data
US 2015/0052193 A1   Feb. 19, 2015

Related U.S. Application Data

(60) Provisional application No. 61/866,390, filed on Aug. 15, 2013.

(51) Int. Cl.
| *H04L 29/06*   | (2006.01) |
| *H04N 21/433*  | (2011.01) |
| *H04N 21/4335* | (2011.01) |
| *H04N 21/436*  | (2011.01) |
| *H04N 21/63*   | (2011.01) |
| *H04N 21/4363* | (2011.01) |
| *H04N 21/4402* | (2011.01) |
| *H04N 21/442*  | (2011.01) |
| *H04N 21/45*   | (2011.01) |

(52) U.S. Cl.
CPC ......... *H04L 65/601* (2013.01); *H04L 65/608* (2013.01); *H04L 65/80* (2013.01); *H04N 21/4331* (2013.01); *H04N 21/4335* (2013.01); *H04N 21/4363* (2013.01); *H04N 21/43615* (2013.01); *H04N 21/4402* (2013.01); *H04N 21/44227* (2013.01); *H04N 21/4516* (2013.01); *H04N 21/632* (2013.01)

(58) Field of Classification Search
CPC ...... H04L 65/601; H04L 65/608; H04L 65/80
USPC ........................................................ 709/203
See application file for complete search history.

(56) References Cited

U.S. PATENT DOCUMENTS

| 6,230,200 | B1 | 5/2001 | Forecast et al. |
| 7,301,944 | B1 | 11/2007 | Redmond |
| 7,574,451 | B2 * | 8/2009 | Burges .............. G06F 17/30026 |
| 7,840,620 | B2 * | 11/2010 | Vignoli ............. G06F 17/30029 |
| | | | 707/705 |
| 8,028,323 | B2 * | 9/2011 | Weel ...................... G06Q 30/06 |
| | | | 709/219 |
| 8,060,638 | B1 | 11/2011 | Kapoor |
| 8,169,916 | B1 | 5/2012 | Pai et al. |

(Continued)

*Primary Examiner* — Kevin Bates
*Assistant Examiner* — Nazia Naoreen
(74) *Attorney, Agent, or Firm* — Banner & Witcoff, Ltd.

(57) ABSTRACT

Aspects of the disclosure relate to a content (e.g., media) transfer or fling platform or system and method in which content may be sent, transferred, or flung from an electronic device to an output device via a rendering device. The content may be transformed (e.g., processed) to meet a content quality based on network conditions and output device capabilities. The media may be stored locally in the electronic device or in a network attached storage or remote from the electronic device. Content stored remotely from the electronic device may also be flung under control of the electronic device.

20 Claims, 5 Drawing Sheets

(56) References Cited

U.S. PATENT DOCUMENTS

| | | |
|---|---|---|
| 8,224,964 B1 | 7/2012 | Fredrickson et al. |
| 8,423,071 B1 | 4/2013 | Sun |
| 8,544,046 B2 | 9/2013 | Gran et al. |
| 8,610,603 B2 | 12/2013 | Lai et al. |
| 8,818,277 B2 | 8/2014 | Chen |
| 8,935,279 B2 | 1/2015 | Skeen et al. |
| 9,179,199 B2 | 11/2015 | Alsina |
| 2002/0099766 A1 | 7/2002 | Tull |
| 2002/0107944 A1 | 8/2002 | Bai et al. |
| 2004/0139318 A1 | 7/2004 | Fiala et al. |
| 2004/0249723 A1 | 12/2004 | Mayer |
| 2005/0188406 A1 | 8/2005 | Gielow et al. |
| 2006/0080703 A1 | 4/2006 | Compton |
| 2007/0107026 A1 | 5/2007 | Sherer et al. |
| 2007/0136322 A1 | 6/2007 | Cormack et al. |
| 2007/0174471 A1 | 7/2007 | Van Rossum |
| 2007/0226338 A1 | 9/2007 | Burch et al. |
| 2008/0098101 A1 | 4/2008 | Black et al. |
| 2008/0177994 A1 | 7/2008 | Mayer |
| 2008/0250458 A1 | 10/2008 | Roman |
| 2010/0057872 A1 | 3/2010 | Koons et al. |
| 2010/0169502 A1 | 7/2010 | Knowlson et al. |
| 2010/0169910 A1 | 7/2010 | Collins et al. |
| 2010/0223407 A1* | 9/2010 | Dong ................. H04N 21/2343 710/70 |
| 2010/0332754 A1 | 12/2010 | Lai et al. |
| 2011/0041065 A1 | 2/2011 | Bangma et al. |
| 2011/0106969 A1 | 5/2011 | Choudhury et al. |
| 2011/0148932 A1 | 6/2011 | Niemi et al. |
| 2012/0089674 A1 | 4/2012 | Staykoff |
| 2012/0136929 A1 | 5/2012 | Li et al. |
| 2012/0311648 A1 | 12/2012 | Swildens et al. |
| 2013/0238777 A1 | 9/2013 | Raleigh et al. |
| 2014/0026201 A1 | 1/2014 | Srinivasan et al. |
| 2014/0156781 A1 | 6/2014 | Childs et al. |
| 2014/0282295 A1 | 9/2014 | Huang et al. |
| 2015/0373140 A1* | 12/2015 | Haenel .............. G06F 17/30902 713/176 |
| 2015/0382054 A1 | 12/2015 | Rao et al. |

\* cited by examiner

MEDIA FLING SYSTEM

CROSS-REFERENCE TO RELATED APPLICATIONS

The present application claims priority to U.S. Provisional Application No. 61/866,390, entitled "MEDIA FLING PLATFORM" and filed on Aug. 15, 2013, the contents of which are hereby incorporated by reference.

BACKGROUND

Current solutions in the market allow personal media (videos, photos, and music) to be sent from a mobile device to a media renderer connected to a consumer television. This "fling" capability is currently not consistent and riddled with consumer use problems and technical limitations. Some issues include: a) lack of quality and reliability due to network limitations and network configuration, b) limitations of various file types, codecs and other environment specific considerations; c) lack of a ubiquitous environment across DLNA, Airplay (Apple) and other protocols; d) lack of end to end monitoring and QoS (Quality of Service) since the service needs to be managed across source device and target device, and e) lack of consistent user experience across apps and devices.

None of these solutions have garnered mass adoption. The Digital Living Network Alliance (DLNA) is perhaps the most used system today. DLNA guidelines specify ways of achieving interoperability but have the disadvantage of excluding most free audio formats and most common video formats. DLNA uses Universal Plug and Play (UPnP) for media, defines the type of device (e.g., "server," "renderer," and "controller") and specifies techniques for accessing media over a network. DLNA has many restrictions over the types of media file formats, encodings and resolutions, and these limitations have limited wide spread adoption of DLNA.

In DLNA solutions today, the time between when a user clicks on her mobile device and when the content appears or begins playing on the TV is usually at least four seconds. This amount of latency presents significant issues especially when users "swipe" through a number of photos quickly. Although some device manufacturers (e.g., HP) have attempted to use techniques such as Twonky Media Server and PacketVideo to alleviate some of the deficiencies of DLNA, these systems do not currently work effectively. Even in closed environments such as Apple's AirPlay, the latency can be 2 seconds or more. In DLNA solutions today, users frequently experience buffering and freezing when they send video to the TV. The video quality is far superior when users simply play on their mobile device versus compared to when they output over Wi-Fi to their TV. In order to establish the required connection between a mobile and TV device to enable flinging today, users need to go through a number of complicated steps. DLNA solutions often involve 1) connecting the TV to the WiFi network and entering WPA credentials, 2) using a mobile phone to manually scan for other DLNA devices on their home network, and 3) configuring the TV to approve mobile devices that can fling to that TV. Users often balk at one of these steps, and thus remain as a practical matter generally unable to render mobile device content on other screens such as TV screens. Additionally, there are many competing standards including AirPlay, DLNA, and Miracast and even within some of these standards there are conflicting protocols. The above mentioned problems can result in issues for consumers including 1) the inability to detect rendering devices and 2) unsuccessful flinging experiences, where the rendering device can not render the content, and 3) poor quality experiences that include frozen video and substantial latency.

SUMMARY

The following summary is for illustrative purposes only, and is not intended to limit or constrain the detailed description.

Some features herein relate to a content (e.g., media) transfer or fling platform or system and method. The media fling or transfer system may enable an electronic device to send, transfer, or fling stored media to an output device via a rendering device. The media may be processed to a certain content quality based on current network conditions and/or capabilities to balance quality and latency to provide a good user fling experience.

In some aspects, the media may be stored in the electronic device or remote from the electronic device and the rendering device. Media stored remotely from the electronic device may be transformed, e.g., processed, at the storage location to meet a certain content quality prior to transmitting the media to the rendering device. The content quality may be determined based on network conditions and capabilities of the output device. Media stored remotely may be flung to the rendering device under control of the electronic device.

The summary provides some examples and is not an exhaustive listing of the novel features described herein, and are not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

Figure 1:
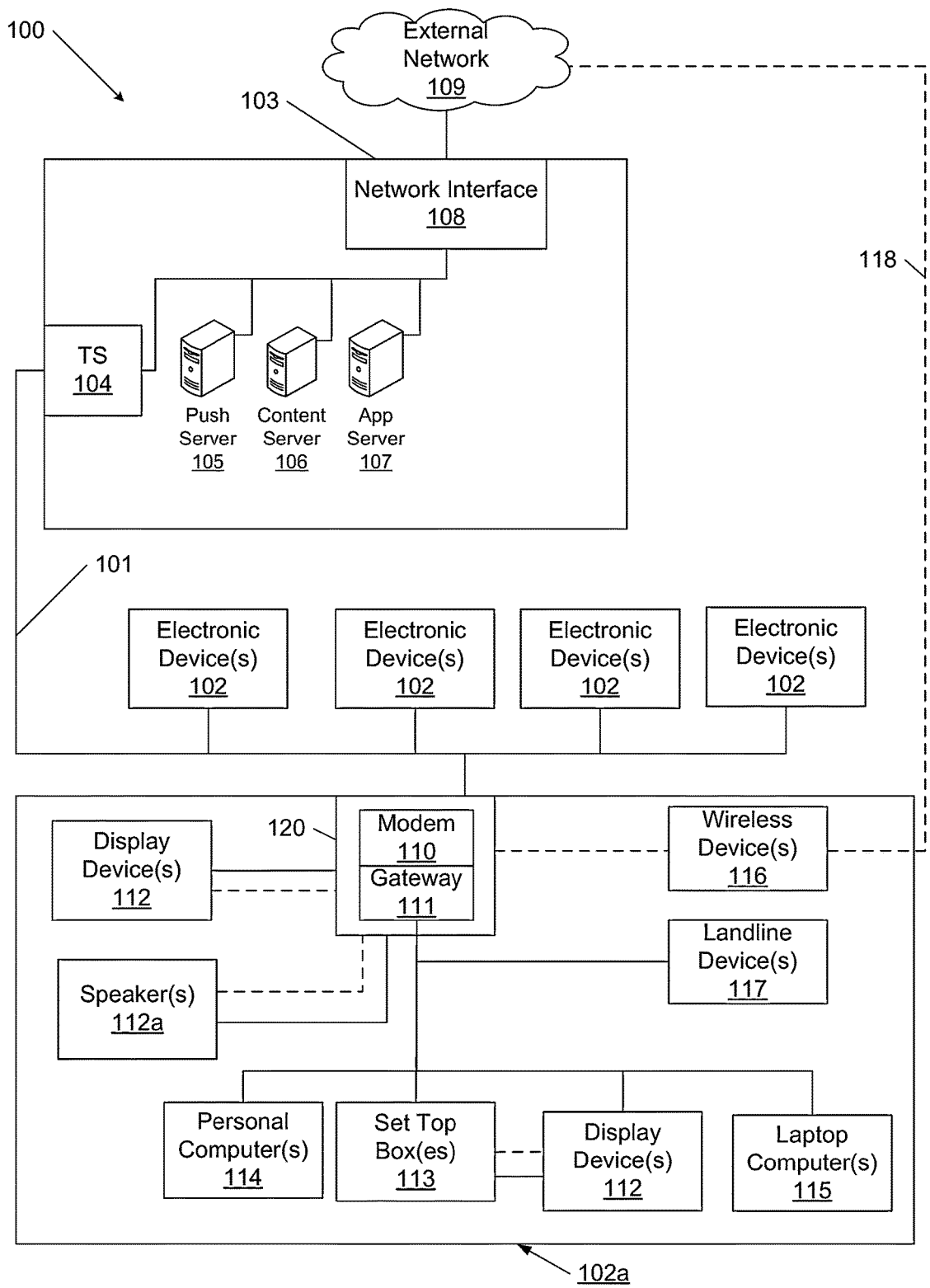
FIG. 1 illustrates an example communication network on which various features described herein may be used.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Aspects described herein may relate to a media fling platform or system. Various aspects of the media fling system are also described in related applications U.S. patent application Ser. No. 14/461,213 filed on Aug. 15, 2014 and entitled "CACHING MEDIA IN A MEDIA FLING SYSTEM," and U.S. patent application Ser. No. 14/461,225 filed on Aug. 15, 2014 and entitled "MULTIPLE FLINGING DEVICES IN A MEDIA FLING SYSTEM," both of which are hereby incorporated by reference herein in their entirety.

The media fling system may support flinging of media content to output device(s). Media may be flung under control of a computing device to an output device(s). The media may be flung from media stored on the computing device or media stored in other devices which may be accessed via a network. The computing device may facilitate the transmission of the media to the output device(s). For example, the computing device may control transmission of the media content to a rendering device in communication with and/or connected to the output device(s).

In some aspects, the media fling platform may provide users with an effortless experience to enjoy their own content through: 1) Accessing content stored in various places on their home network or in the cloud, 2) Using one or more mobile devices to control their content on various connected devices across mobile and fixed networks, 3) Optimizing the delivery of the content between the source and the renderer, and 4) Enabling content access, control, and rendering across mobile and fixed networks. The platform may be configured to enable users to navigate and control their own content using their mobile devices while viewing and consuming the content on their TV.

A user's "own" content may, for example, include 1) personal media such as photos, video, and music 2) professional and semi-professional content such as movies. The content may be stored in the mobile devices themselves, personal, public, and/or semi-private clouds, home PC, network attached storage (NAS), Internet Video Services, and/or third party clouds. Embodiments of the platform may include one or more DLNA server(s), content controller(s), Miracast and/or multicast server(s), audio server(s) including queuing controller, zone controllers and synchronization controllers, client application logging such as determining user analytics, rendering device controls such as operator selectors, device resets, factory default and configurable settings, business logic, DMR filters and compatible renderers, transcoders, server orchestrator (mediates contention between streaming protocol servers), cloud tune for assets located in cloud, application white-list check for administrative functions (e.g. operator selector, device reset, factory default), re-encapsulation media assets to support incompatible renderers, transcoding of media assets to support incompatible renderers, and enforcement of DTCP content protection for premium paywall content. The platform rendering device may include one or more DLNA renderer(s), player(s) including queue(s), Miracast and/or multicast renderer(s), audio renderer(s) including queue, zone controller and synchronization manager, client analytics, rendering device control(s), and business logic. Content may be accessed and rendering devices may be recognized across LAN and WAN networks and across mobile and fixed networks. The platform may also include one or more tuned video pipeline(s), one or more buffering platform(s) for handling multiple video media types, one or more server orchestrator(s) for mediating contention between streaming protocol servers, one or more Wi-Fi optimizations specifically tuned to allow consistent QoS from any platform capable mobile device and application.

The fling platform in many embodiments may be portable across mobile operating systems as well as various types of rendering devices.

With mobile phones increasingly fulfilling multiple functions for users including as cameras and video recorders, the Fling platform may be configured to seamlessly take those events and allow users to move it from the small screen in their hands to another screen such as the television without the user having to be aware of whether they had an iPhone/iPad, Microsoft tablet, an Android device, or some other mobile and/or handheld/hand-holdable device.

FIG. 1 illustrates an example communication network 100 on which many of the various features described herein may be implemented. Network 100 may be any type of information distribution network, such as a fiber, hybrid/fiber coax, internet, Internet, intranet, satellite, telephone, cellular, wired, and/or wireless, etc. Examples may be a wireless phone network, an optical fiber telecommunication network, a coaxial cable distribution network, and/or a hybrid fiber/coax distribution network. Such networks 100 may be configured to use a series of interconnected communication links 101 (e.g., coaxial cables, optical fibers, wireless, etc.) to connect multiple electronic devices 118 (e.g., computers, laptop, set-top boxes, tablets, smart phones, televisions, terminals, networks, etc. remotely located at, for example, businesses, homes, consumer dwellings or other locations remote from the central communication system) to central communication system 103 such as an internet, Internet, local office, server, internal and/or external network and/or headend. The central communication system 103 may transmit downstream information signals onto one or more links 101, and the electronic devices 102 may have one or more communication devices to receive and process various signals from the links 101.

There may be one link 101 originating from the central communication system 103, and it may be split and/or repeated a number of times to distribute the signal to various electronic devices 102 in the vicinity (which may be many miles) of the central communication system 103. The links 101 may include components not illustrated, such as splitters, repeaters, filters, amplifiers, etc. to help convey the signal clearly. Portions of the links 101 may also be implemented with fiber-optic cable, while other portions may be implemented with coaxial cable, other lines, and/or wireless communication paths.

The central communication system 103 may include an interface, such as a termination system (TS) 104. More specifically, the interface 104 may be a cable modem termination system (CMTS), which may be a computing device configured to manage communications between devices on the network of links 101 and backend devices such as servers 105-107. The interface 104 may be as specified in a standard, such as any of the standards used on the Internet (e.g., IP), any connection or connectionless protocol, the Data Over Cable Service Interface Specification (DOCSIS) standard, published by Cable Television Laboratories, Inc. (a.k.a. CableLabs), or it may be a similar or modified device instead. In other embodiments, the interface 104 may be a wireless receiver. The interface 104 may be configured to place data on one or more downstream frequencies to be received by modems located with the various electronic devices 102, and to receive upstream communications from those modems on one or more upstream frequencies.

The central communication system 103 may also include one or more network interfaces 108, which can permit the central communication system 103 to communicate with various other external networks 109. These networks 109 may include, for example, networks of Internet devices/servers/locations, internet devices, Intranet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones. Further, central communication system 103 may itself form a part of a larger communication network. In various exemplary embodiments, those networks may be a private network, the internet, and/or the Internet.

As noted above, the central communication system 103 may include a variety of servers 105-107 that may be configured to perform various functions. The servers 105-107 may themselves comprise other servers and/or load balancing networks. For example, the central communication system 103 may include a push notification server 105. The push notification server 105 may generate push notifications to deliver data and/or commands to the various electronic devices 102 in the network (or more specifically, to the devices associated with the electronic devices 102 that are configured to detect such notifications). The central communication system 103 may also include a content server 106. The content server 106 may be one or more computing devices that are configured to provide content to electronic devices. This content may be, for example, video on demand movies, television programs, songs, text listings, etc. The content server 106 may include software to validate user identities and entitlements, to locate and retrieve requested content, to encrypt the content, and/or to initiate delivery (e.g., streaming) of content to the requesting user(s) and/or device(s).

The central communication system 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the electronic devices 102. Although shown separately, one of ordinary skill in the art will appreciate that the push server 105, content server 106, and application server 107 may be combined. Further, in FIG. 1, the push server 105, content server 106, and application server 107 are shown generally, and it will be understood that they may each contain memory storing computer executable instructions to cause a processor to perform steps described herein and/or memory for storing data and function in accordance with any of the algorithms described herein.

An example of the electronic devices 102 is shown in more detail as a collection of electronic devices 102a (e.g., a cell phone, tablet, set-top box, television, and/or laptop) and may optionally include an interface 120. The interface 120 can include any communication circuitry needed to allow a device to communicate on one or more links 101 with other devices in the network. For example, the interface 120 may include a modem 110, which may include transmitters and receivers used to communicate on one or more of the links 101 and with the central communication system 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. For example, some of these modems may be wired, some may be wireless such as 802.11 and/or 4G, and others may be suitable to other technologies such as WiMax and/or fiber.

Further, the interface 120 may include a gateway interface device 111. The modem 110 may be connected to, or be a part of, the gateway interface device 111. The gateway interface device 111 may be a computing device that communicates with the modem(s) 110 to allow one or more of the electronic devices 102a, to communicate with the central communication system 103 and other devices beyond the central communication system 103. The gateway 111 may be a set-top box (STB), digital video recorder (DVR), computer server, or any other desired computing device such as a phone, tablet, and/or laptop. The gateway 111 may also include (not shown) local network interfaces to provide communication signals to requesting entities/devices associated with the electronic devices 102a, such as display devices 112 (e.g., televisions, tablets), additional STBs 112, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others. The wireless devices 116 may connect to the links 101 via the interface 120 or via a wireless communication link 118 with the external network 109. The wireless communication link 118 may be a cellular connection or a connection to a wireless wide area network (WWAN).

Figure 2:
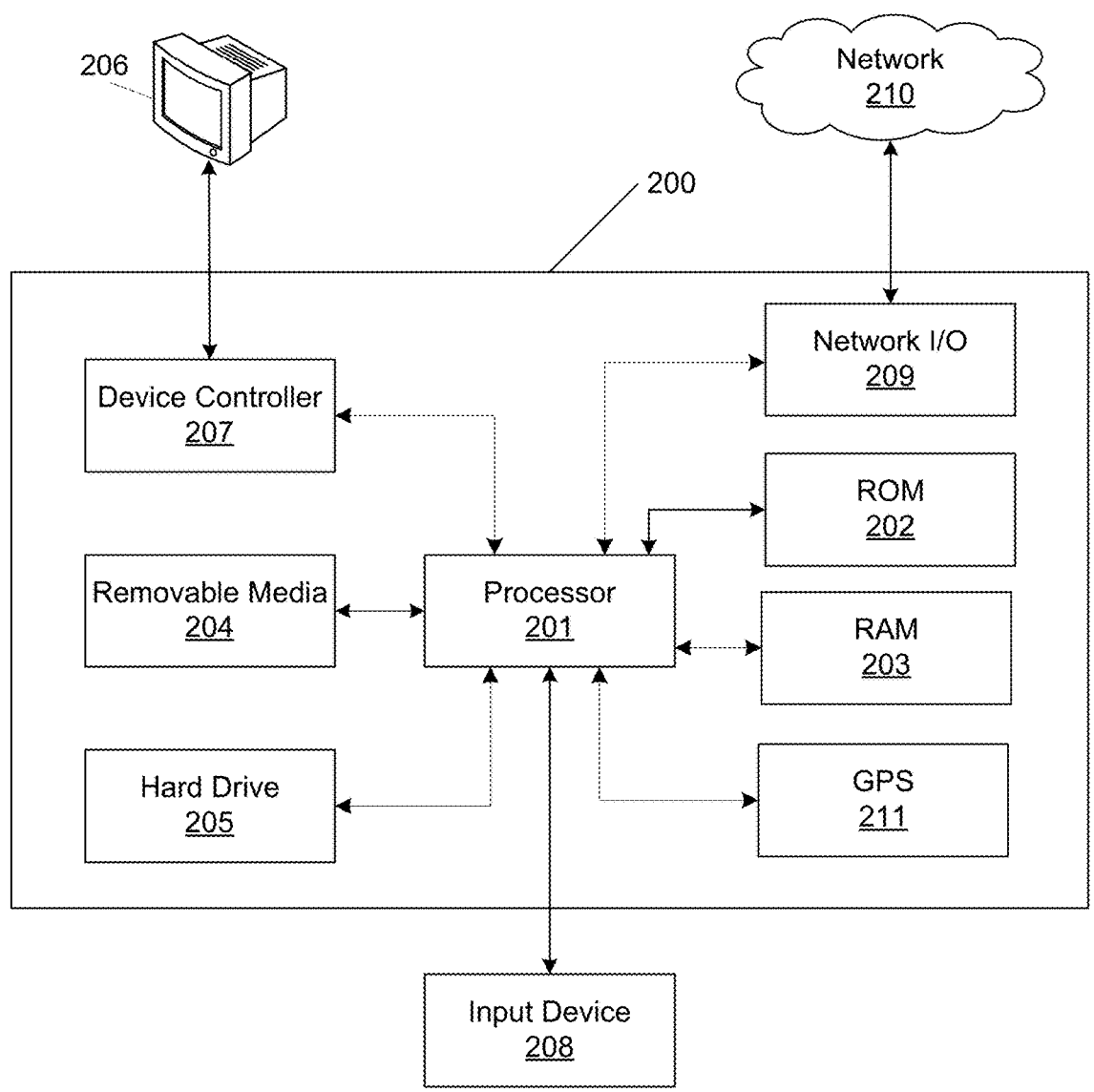
FIG. 2 illustrates an example computing device that can be used to implement any of the methods, servers, entities, and computing devices described herein.

FIG. 2 illustrates general hardware elements that can be used to implement any of the various computing devices discussed herein. The computing device 200 may include one or more processors 201, which may execute instructions of a computer program to perform any of the features described herein. The processor may include one or more decoders for video compression and/or decompression. In some devices such as cellular telephones and/or tablets, the processor 201 may include a single decoder for video. The instructions for the processor 201 may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205.

The computing device 200 may include one or more output devices, such as a display 206 (e.g., an external television), and may include one or more output device controllers 207, such as a video processor (e.g., a macroblock video decoder such as AVC/H.264). There may also be one or more user input devices 208, such as a remote control, keyboard, mouse, touch screen, smart phone, tablet, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem, fiber modem, and/or wireless modem), and the external network 210 may include the communication links 101 discussed above, the external network 109, an in-home network, a provider's wireless, coaxial, fiber, hybrid fiber/coaxial distribution system (e.g., a DOCSIS network), and/or any other desired network. Additionally, the device may include a location-detecting device, such as a global positioning system (GPS) microprocessor 211, which can be configured to receive and process global positioning signals and determine, with possible assistance from an external server and antenna, a geographic position of the device. In some embodiments, the computing device 200 may include a Digital Living Network Alliance (DLNA) compliant protocol renderer, AirPlay (a registered trademark of Apple) compliant renderer, or other rendering device for receiving flung content and rendering it onto one of the output devices such as displays and/or speakers.

The examples in FIG. 1 and FIG. 2 may be modified in various ways. For example, modifications may be made to add, remove, combine, divide, etc. components of the computing device 200 and/or communication network 100 as desired. Additionally, the components illustrated may be implemented using basic computing devices and components, and the same components (e.g., processor 201, ROM storage 202, display 206, etc.) may be used to implement any of the other computing devices and components described herein. For example, the various components herein such as those in FIG. 1 may be implemented using computing devices having components such as a processor executing computer-executable instructions stored on a computer readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3:
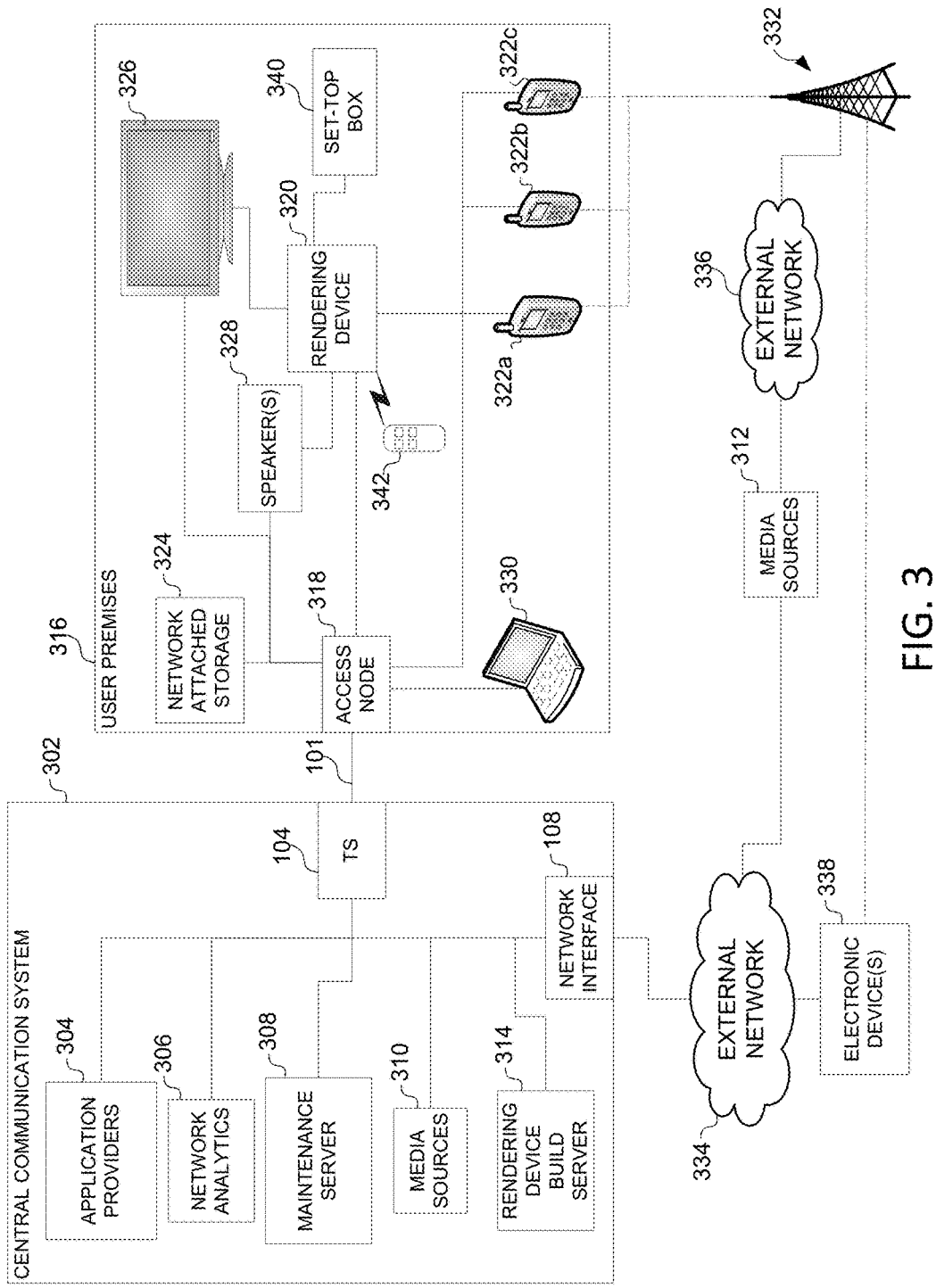
FIG. 3 illustrates an example media fling system according to various aspects of the disclosure.

FIG. 3 illustrates an example of a media transfer or fling platform or system 300 in accordance with some aspects of the disclosure. While the media fling platform 300 may be variously configured (including configurations shown in FIGS. 1-2), an alternate configuration is shown in FIG. 3. In one embodiment, the media fling platform 300 may include one or more of the components as shown. The media fling system 300 may include a central communication system 302 and a user premises 316.

The central communication system 302 may be configured similar to the central communication system 103. The central communication system 302 may further include servers or computing devices 304, 306, 308, 310, 314 which can perform various functions. The servers or computing devices included in the central communication system 302 may communicate with electronic devices at a user premises 316 via communication links such as communication links 101. The central communication system 302 may communicate with devices at the user premises 316 via the termination system (TS) 104 of the central communication system and access node 318 at the user premises 316. The central communication system 302 may communicate with external network(s) 334 via network interface 108. The central communication system 302 may include application providers 304, network analytics 306, maintenance server 308, and media sources 310.

The application providers 304 may be a server(s) hosting an application store or providing applications for flinging and/or configuring the media fling platform 300. The application store may serve as the source of flung media content.

The network analytics server 306 may provide data analysis of the various networks within and around the user premises 316 and between the user premises 316 and various external sources such as the central communication system 302 and/or network attached resources. The network analytics server 306 may be configured to analyze various types of traffic on the different networks, devices, and system. The network analytics server 306 may receive data relating to all fling platform functions such as flung media, transcoding, rendering, encoding, and resolution to the most efficient parameters to enhance the user experience based on measured performance values such as buffering, paused video, network congestion, competing flung media, and output device capabilities and availability. The network analytics server 306 can also be used to analyze the overall "health" of the platform, customer usage statistics and trending and longer term business intelligence.

The maintenance server 308 may provide a mechanism to collect, index and harness data (e.g., machine data, media data, media flows, program flows, game flows and other data) generated by flung media and applications, as well as associated networks, servers and devices including physical devices/networks, virtual devices/networks and cloud based devices/networks. The maintenance server 308 allows the media fling platform to troubleshoot application problems in real-time, investigate security warnings and flings in real-time in order to avoid service degradation or outages associated with the media fling platform to deliver a more robust and reliable user experience. The maintenance server 308 may be configured to receive various event data including crash logs, latency parameters, and run network analytics to determine and correct issues that may impact user experience before they impact the user media fling experience. Such issues might include microwave interference with a wireless network frequency range and switching the preferred fling network channel to certain display and/or rendering devices responsive to environmental condition changes. The maintenance server also allows for the ability to merge disparate data across sources in order to drive better operational analytics across the fling platform. One example of this is the ability to correlate data from the source fling application (on the mobile device) to the target fling device (rendering device connected to an output display device (e.g., television)) and determine start and end fling times. This data can be used to monitor and manage service level agreements and other operational monitoring required to ensure a good quality of service.

Media sources 310 may include a variety of server or computing devices that store or otherwise provide access to media or media content including but not limited to pictures, videos, games, comments, slides, music, postings, web content, etc. The media sources 310 may include network sources and/or applications such as social network applications including Facebook, Twitter, Instagram, or other proprietary applications such as those hosted by media or network providers including Comcast, Verizon, Time Warner, Disney, NBC, AT&T, Netflix, Hulu, etc. Additionally, the application store 304 may be the source of flung media content, for example, purchased media content (e.g., movies, tv shows). Further, content need not reside within a mobile application or in a cloud network source. Media content may also be stored on a home network device such as a computer 330 or network attached storage (NAS) 324 which may be used as a source device of flung media. The media sources 310 may be included in the central communication system 302 or be accessed through an external network such as external networks 109, 334, 336.

Turning to the devices at the user premises 316, one or more access interfaces or nodes 318 may be provided at the user premises 316. The interface 318 may be implemented similar to interface 120 and may include a gateway interface device 111 and modem 110 to communicate with the central communication system 302. Various electronic devices 320, 322, 324, 326, 328, 330, may be connected to the access interface 318 to communicate with the central communication system 302 and with other devices connected to the access interface 318. The electronic devices 320, 322, 324, 326, 328, 330 connected to the access interface 318 may form a network at the user premises 316. The connections between the electronic devices 320, 322, 324, 328, 330 may be wired and/or wireless connections. Additionally, one or more electronic devices 322a-c may be present and flinging at the user premises 316.

Some of the devices at the user premises 316 may be able to connect to more than one type of network and fling content over more than one network. For example, electronic device 322 may be an electronic device with cellular network connection capabilities such as a mobile phone, laptop, or tablet device which can connect with access node 318 and an external cellular network 332, 336. Via the external network 332, 336, the electronic device 322 can also access various media sources 310.

As will be described herein, a user may use the electronic device 322 and associated applications to fling content to one or more output devices (e.g., television 326, speaker(s) 328, computer 330) via a rendering device 320. The flung content may include applications, photos, videos, games, music, files, and/or other data stored remotely from the electronic device 322, in the electronic device 322, or locally (e.g., NAS 324, computer 330). These mobile devices and associated applications 314 may initiate and control the media fling platform in a similar manner to how a remote control device today controls a television. However, the mobile device 314 and its associated applications creates a unique and customized user experience that enables the user to take his experience with him or her wherever they happen to go such as to a friend's house, family member's house, sports bar, neighbor's house, summer home, hotel, boat, car, plane, train, and/or different rooms of their own house. The user's media follows the user's mobile device and can be flung to any associated output device such as display and/or audio devices (e.g., display devices 112 and/or separate speakers/headphones 112a). Thus, the user may "carry" his or her own content with them to whatever location they happen to travel. The content may be located on the mobile devices 322, 330, and/or may be located at servers in the home 324, and/or in the cloud 310, 312.

Computing device or rendering device 320 (e.g., a set-top box, IP set-top box, gateway or other suitable device) may transcode, fling, and/or transport flung media. Rendering device 320 may be a standalone unit such as an associated AirPlay or BuddyBox type device, a rendering device unit, a gateway, and/or a set-top box which functions to render media to various output devices (speakers, displays, lights) under user control such as under control of mobile devices 322, 388, and/or fixed/mobile devices such as set-top box 314 and/or a remote control 340. While shown as a standalone device, the rendering device 320 may also be included in the access node 318. The rendering device 320 may be configured with various media interfaces such as DLNA, Airplay, wireless, and/or wired network interfaces to enable media to be flung to any suitable output device including displays, speakers, and/or lights. Each electronic device at the user premises 316 may be connected to one or both the access node 318 and the rendering device 320. When connected to the same network, each device can act in a coordinated manner.

The NAS 324 may be associated with the electronic device 322 and/or computing device(s) 330 and/or other various computing devices such as set-top boxes. Various devices connected to the same network as the NAS 324 may use the NAS 324.

Media storage devices (e.g., electronic device 322, NAS 324) may include a pipelined processing and/or multi-threaded processing environment to decrease latency. For example, downsampling may be occurring at the same time as transcoding as well as transferring of media items. The media item may be encoded in discrete separable macro blocks. Transcoding of a portion of a first media item may be occurring while another portion of the same media item is being downsampled, which may occur while another portion of the media item is being transferred to the rendering device. A pipelined operation may substantially reduce latency and may use a multi-core and/or multi-threaded processor when available at the media storage location. In some aspects, the pipelined multi-threaded processing operation may be used to send media items in a continuous manner so that an output cache or buffer of media items to transfer to the rendering device may constantly have data available to send.

Various servers such as server 310, 312, 105, 106, 107 and/or other media sources such as packet video source may be utilized to fling media under, for example, control by the various mobile/wireless devices. Further, the rendering devices may be under the control of a remote rendering device build server 314 which can dynamically reconfigure the rendering device to be more efficient dependent on the types of media being flung and/or the devices associated with the rendering device. Servers such as the maintenance server 308 can also act as remote management servers that can do introspective analysis of a user's device. This includes the ability to reboot, re-flash software, and take over control for remote management needed for problem resolution. Additionally, these cloud components may be configured to 1) detecting rendering devices across LANs/WANs, 2) accessing content across LANs/WANs, 3) streaming content between LANs/WANs, and/or render the same content cross LANs/WANs and/or across disparate devices connected across LANs/WANs.

Figure 4A:
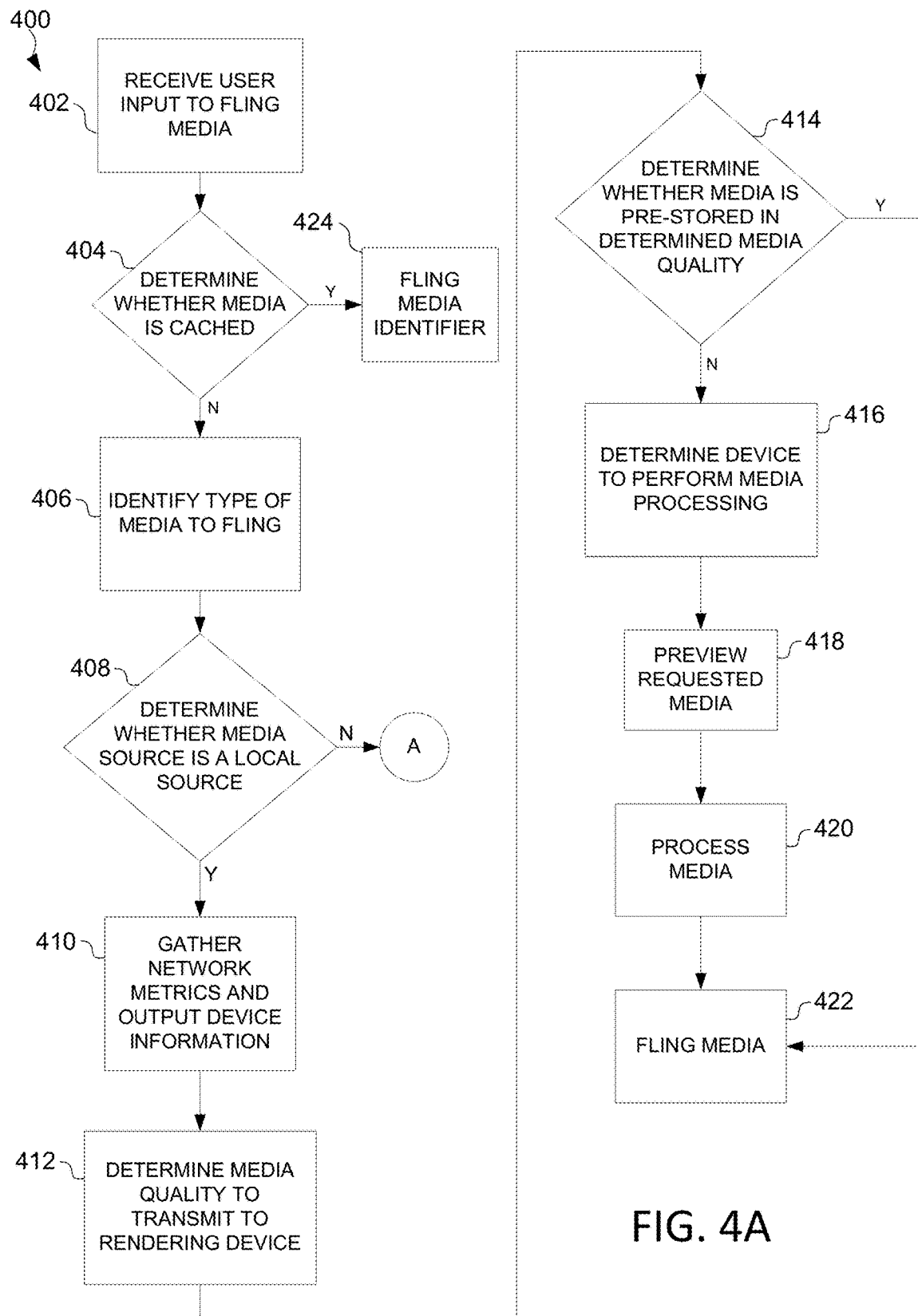
FIGS. 4A-B illustrate an example method of flinging media according to various aspects of the disclosure.
Figure 4B:
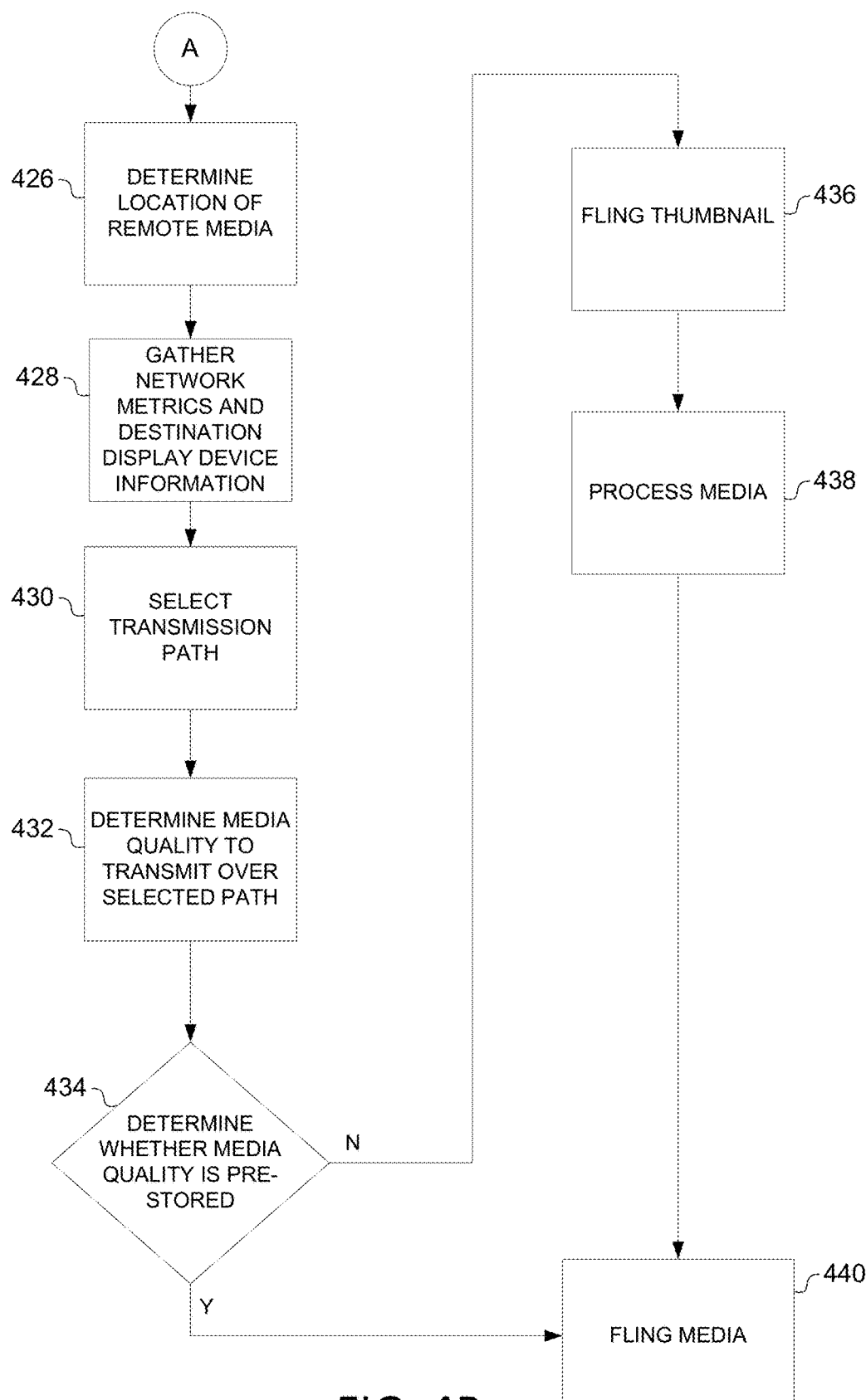

FIGS. 4A-B illustrate an example method of sending, transferring, or flinging content (e.g., media) 400. FIG. 4A includes a portion of the method directed to sending, transferring, or flinging media when the media source is a local source or the media is cached, and FIG. 4B includes a portion of the method directed to sending, transferring, or flinging media when the media source is not a local source such as a source located in another network (e.g., cloud source).

At step 402, a user may use an electronic device such as device 322 to input a fling request. The fling request may be in various forms. For example, a user may display and/or select content (e.g., media) on the electronic device and request that the media be flung to a particular output device. The user may select the output device and/or the output device may be automatically selected based on the type of media being flung. As another example, the user may be browsing through media, and the media may be flung as the user views or previews the media. For each media to be outputted to an output device, the electronic device 322 may transform (e.g., process, transcode, re-encapsulate, re-sample, etc.) the media for a fling request.

At step 404, the system may determine whether the media is cached at the rendering device, for example, as a result of a previous fling or of predictive caching. Caching of media is described in U.S. patent application Ser. No. 14/461,213 and entitled "CACHING MEDIA IN A MEDIA FLING SYSTEM" which is incorporated by reference in its entirety. The electronic device may query an index of the cache to determine if the selected media is stored in the cache using an identifier of the media. The rendering device may return a response to the electronic device indicating whether or not the selected media is stored in the cache. Alternatively, the electronic device may store a history of media items transmitted for caching. If the media is not cached, the method may proceed to step 406. If the media is cached, the electronic device may transmit a fling request to the rendering device including the identifier of the media at step 424. Using the identifier, the rendering device may retrieve the media from the cache and output the media to the output device.

At step 406, the electronic device 322 can identify the type of media to fling. For example, the device 322 can determine if the media in the fling request is at least one of pictures, videos, games, comments, slides, music, postings, web content, etc.

At step 408, the electronic device 322 can determine whether the media source of the requested media is a local source. For example, the electronic device 322 can determine whether the media to fling is stored on the electronic device 322 and/or in a network attached storage device 324. If the media is locally stored the method may proceed to step 408. The electronic device 322 may determine that the media source is a remote or cloud source if, for example, the media source 310 is located in the central communication system 302 or accessed via an external network to the electronic device 322 such as networks 334, 336. A proxy server may intercept and process a fling request for media stored remotely from the mobile device. If the media source is a remote source, the method may proceed to 410 which will be described with respect to FIG. 4B.

Continuing in FIG. 4A, the method may proceed to step 410 if it is determined in step 408 that the media is locally stored. After determining the location of the media to fling, the system may gather and/or provide information about network metrics and the output device. For example, network analytics server 306 may provide information regarding bandwidth and latency of the transmission path for the media from the media source to the rendering device 320. The fling or media transfer application on the electronic device 322 may be able to analyze the connection between the local media source (e.g., electronic device 322, network attached storage device 324, computing device 330). For example, if the media is will be flung or transferred over a wireless connection, the fling application may obtain information about the available bandwidth and latency of the wireless (e.g., wi-fi) connection and conduct a pre-emptive analysis of the wireless connection. Similarly, if the connection is a wired connection (e.g., Ethernet), the media application may obtain data about the available bandwidth and latency of the wired connection. The fling application may obtain information about the output device, for example, the supported display resolutions of display device 326.

At step 412, the fling application may determine the appropriate media quality to transmit to the rendering device based on the network metrics and output device information gathered in step 410. For example, the media may be downsampled until the desired latency is achieved because downsampling reduces file size. The fling application may estimate the transmission latency of the media at various media quality levels based on current network conditions, and the user may be provided with the option to select the desired media quality based on the user's desired transmission latency. The application may analyze the estimated file size of the media at various media quality levels (e.g., 50% resolution, 60%, 70%, 100%) and estimate the transmission latency based on the current wireless or wired connection speed or available bandwidth.

In some instances, the media may be flung to multiple output display devices with different resolutions. The system may fling different files with different sampled resolutions where there is sufficient bandwidth or negotiate to use the lower of the display resolutions where there is insufficient bandwidth to maintain satisfactory latency. In some cases, it may be more efficient to fling the high resolution and/or original resolution file and downsample to the appropriate resolutions for the selected output devices at the rendering device.

In another aspect, the system may support dynamic resolution adjustment for the fling content. For example, the system may enable the maximum resolution to be used when prevailing network conditions can support maximum resolution and a backup position where network analytics determine that prevailing network conditions at the time of or during the fling dictate a different (e.g., lower) resolution.

Each media item being transmitted to the rendering device may be assigned a quality of service or priority. For example, the media to currently fling may be prioritized higher than media being transmitted or transferred for caching purposes.

At step 414, the system may determine whether the media is pre-stored in the cloud in the determined media quality. For example, media may be processed before a fling request is received for the media and pre-stored in various resolutions and/or formats such that the fling application may identify the file containing the selected resolution and/or format and directly fling the stored file without needing to further process and/or transcode and/or re-encapsulate the media before flinging. If the system determines that the media is pre-stored in the appropriate format, the method may proceed to step 422 and fling the appropriate file. If the media is not pre-stored in the appropriate format, the method may continue to step 416.

In step 416, the system may determine which device is to transform (e.g., process, transcode, re-encapsulate, re-sample, etc.) the requested media into the appropriate format. For example, the fling application can determine the capabilities of the electronic device 322 such as the processing power, compatibility, and/or battery life. The electronic device 322 might not possess the proper protocol stacks to transcode locally stored media to be compatible with the display device and/or rendering device. The current battery power remaining on the electronic device 322 might not be sufficient to complete processing of the media. Additionally, the electronic device might not have sufficient processing power to transform (e.g., process, transcode, etc.) the media in real time. If the electronic device 322 does not meet a certain profile and/or have sufficient remaining battery power, the user can be notified that the electronic device 322 can not support processing of the media file. If the remaining battery power is insufficient to handle processing the media content, the user may be advised to charge and/or plug the electronic device 322 into an outlet in order to continue with the media fling. If the electronic device 322 does not meet the profile and/or have sufficient battery power, the options which the electronic device 322 can not handle may become unselectable (e.g., greyed out).

Other parameters may affect the decision as to whether the electronic device 322 is capable of handling the processing without adversely affecting a user's experience. For example, the transcoding process is usually a computationally intensive activity on the electronic device 322 that might cause the processor of the electronic device 322 (e.g., central processing unit (CPU)) to increase to a higher current utilization and therefore cause higher battery consumption.

If the fling application determines that the electronic device can handle processing the requested media, the electronic device 322 may initiate processing of the requested media. In the event the fling application determines that the electronic device can not handle processing the requested media, the fling application may notify the user and/or offload the processing to another device, for example, a proxy server remote from the electronic device.

In other embodiment, the fling media system may analyze the electronic device, the media asset, and the rendering device 320 to determine the capabilities and limitations of each item. Where there is an incompatibility, the user can be informed of this issue prior to flinging the media and/or hiding the option associated with the incompatible feature. In some cases, devices are unable to play certain media assets. The system can have a processor determine certain format types that are playable on certain rendering devices using compatibility databases and metadata, and convert the media to a format type playable on the rendering device.

At step 418, the electronic device 322 may provide a preview of the requested media. For example, if the media content is a visual content form (e.g., video, picture) the electronic device 322 may fling a placeholder image to both notify the user that the requested media is being processed and to provide the user with a preview of the requested media on the output device. For video content, the electronic device may fling a lower resolution frame of the video to quickly transmit the image to the rendering device. For a picture or image, the device may fling a thumbnail image which may be a lower resolution version of the full size image.

At step 420, the requested media may be transformed (e.g., processed) for flinging. The processing device may be the electronic device 322. The processing device may transcode, re-encapsulate, resample, and/or convert the format of the requested media. The processing device may resample the media to increase or decrease the resolution of the media. The processing device may change the file format of the media. For example, a picture in the jpeg format may be converted to a more efficient file format of WebP.

The processing may re-encapsulate the media if the codec used in the media file is compatible with the rendering device but the container of the media is not playable. For example, a MOV file and a mp4 file may both have aac codecs, but the rendering device might not be able to play the MOV file in its current form since the manifest file is at the end of the MOV file. The re-encapsulation may move the manifest file to the beginning which is needed to support seek points when streaming a video file.

For visual media (e.g., pictures and/or video), the processing device may convert the media to match the resolution of the media to the maximum resolution of the output display device or portion of the screen in which the media is being displayed. For example, if the display device can display up to a resolution of 1280×720 pixels (720p) and the native media content is coded for 1920×1080 pixels (1080p or 1080i), the processing device may downsample the media content before flinging the media to the rendering device 320. As another example, a 16 megapixel picture may be downsampled to be displayed on a lower resolution display device. The ability to downsample the media content before flinging the media enables the system to more efficiently transfer the media to the rendering device. In particular, the downsampling of the media content reduces the file size and therefore the load on the network without affecting the user experience because the output display device does not support the higher resolution.

The output display device may be able to simultaneously or concurrently support display of more than one media content. For example, an output display device may display media from a first source in a first window or portion of the display device and display media from a second source in a second window or portion of the display device. The first source may be, for example, a broadcast source. The second source may be the rendering device. Because the second source may be displayed on a portion of the display device rather than the entire display, the second source might not utilize the full supported resolution of the display device. The rendering device may receive the supported display resolution or dimension size of the second portion of the display device. The processing node may accordingly process the requested media to match the display resolution of the second portion of the display device. In some aspects, the network analytics may provide the user with feedback about the probable latency of a given selected resolution, media source, and/or window size and allow the user to optimize based on user experience or desired user experience (e.g., the user may selected desired latency of less than one second, and the system will reconfigure the resolution to achieve the desired user experience.).

After transforming or processing the requested media into the selected form, the electronic device 322 may send, transfer, or fling the processed media to the rendering device 320 to output on the output device. For example, the requested media may be a video, and the electronic device 322 may transmit the processed video via the access node 318 to the rendering device 320 for output on the display device 325. As another example, the electronic device 322 may have a direct connection with the rendering device 320. The direct connection may be a wired connection or a wireless connection (e.g., short-range wireless connection, Bluetooth, etc.).

As mentioned above, in the event that the media is not stored locally as determined in step 408, the method may proceed to step 426 as shown in FIG. 4B to determine the location of the remote media. For example, the fling application on the electronic device may identify the media source 310 (e.g., the server and/or storage device) storing the requested media. The electronic device may transmit or direct the fling request to the media source 310. A proxy server may intercept the fling request and process the fling request. The proxy server may be a server located in the central communication system 302, or the electronic device 322 may act as the proxy server.

Based on the network location of the media source 310, the proxy server may gather and/or obtain data metrics (e.g., available bandwidth, latency, quality of service priorities) about potential paths for transmitting the media to the rendering device 320. There may be multiple paths that the media may take from the media source 310 or a processing node to the rendering device 320. For example, the media source 310 may be located in the central communication system 302 and be transmitted over communication link 101 to the rendering device 320. Another option may be to transmit the media via network interface 108 over one or more external networks 334, 335 to electronic device 322 which can send the media to the rendering device 320 when the data metrics for the communication link 101 indicate that communication link 101 already loaded with traffic and would not support a good user fling experience.

In another variation, the media source 310 may be part of an external network and accessed via external networks 334, 336. In this variation, the media may be transmitted from media source 310 over external network 336 and cellular network 332 to the electronic device 332 and passed from electronic device 332 to the rendering device 320. Another option may be to transmit the media from media source 310 via external network 334, the central communication system 302, and link 101 to the rendering device 320. The media may be processed in the central communication system 302 before transmitting the media to the user premises 316.

The proxy server may receive the network metrics of the various paths from for example, the network analytics server 306. The proxy server may transmit test packets to obtain the characteristics of the various transmission paths.

At step 430, the electronic device may use the received and/or obtained network metrics of the various paths to select an efficient transmission path based on the type of media being flung. For example, because video is time-sensitive, the system may select a transmission path that results in lower overall latency than a transmission path with greater available bandwidth but higher overall latency. Additionally, the system may more favorably consider transmission paths which prioritize certain types of traffic and/or traffic originating from a particular source and/or provider.

After a transmission path is selected, the fling application may determine the media quality (e.g., encoding, bit rate, resolution, format) to efficiently transmit the media over the selected transmission path taking into account information about the capabilities of the output device. For example, the fling application may receive information about the display capabilities of the display device (e.g., resolution, standard definition, high definition).

As discussed herein, the media may be pre-stored at the media source 310 in various configurations and formats. At step 434, the system may determine whether a version of the media matching the determined media quality is already stored at the media source 310. If the media is pre-stored in the appropriate format, the system may initiate transmission of the media in the appropriate format or quality to the rendering device without any additional processing (e.g., conversions and/or transcoding) of the media by, for example, flinging an identifier corresponding to the media in the appropriate format or quality at step 442. If the media is not pre-stored in the appropriate format, the system may notify a media processing node in the network to transform (e.g., process) the requested media into the appropriate format at step 438.

Before or during the processing of the media, the system may fling a thumbnail of the media to the rendering device 320 to present on the display device at step 436.

In step 438, the media processing node may transform (e.g., process) the requested media into the media quality similar to step 420 in FIG. 4A. The processing node may fling the media in step 440 similar to step 422 in FIG. 4A. The media may be directly flung from the media source 310 such that the electronic device may not need to be present at the user premises to maintain the media fling.

In some instances, the rendering device may be a set-top box that might not support an internet protocol (IP) connection. In addition to any processing for media quality, the media to be flung to the set-top box may be converted into a stream compatible with the set-top box. For example, fling photos may be converted into a MPEG2 stream, and the MPEG2 stream may be transmitted to the set-top box.

Although example embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

We claim:

1. A method comprising:
   processing, by a computing device, a request to send stored content to a rendering device;
   determining, by the computing device, whether the stored content is cached by the rendering device;
   transmitting, by the computing device and responsive to a determination that the stored content is cached by the rendering device, an identifier of the stored content to the rendering device; and
   responsive to a determination that the stored content is to be transmitted to the rendering device:
      determining, by the computing device, a content quality level to transmit to the rendering device based at least on a desired transmission path between a storage location of the stored content and the rendering device;
      processing, by the computing device, the stored content to the content quality level to generate transformed content; and
      transmitting, by the computing device and to the rendering device, the transformed content via the desired transmission path.

2. The method of claim 1, further comprising:
determining whether the storage location of the stored content is in the computing device or remote from the computing device.

3. The method of claim 2, further comprising:
in response to determining that the storage location of the stored content is remote from the computing device, selecting the desired transmission path for the stored content from the storage location to the rendering device.

4. The method of claim 1, further comprising:
gathering network metrics and device capabilities of an output device associated with the rendering device.

5. The method of claim 4, wherein the determining the content quality level to transmit to the rendering device comprises:
determining the content quality level to transmit to the rendering device based on the network metrics and the device capabilities of the output device.

6. The method of claim 4, wherein the device capabilities comprise resolutions supported by the output device, and wherein the determining the content quality level comprises:
determining that a resolution of the stored content is to be a maximum resolution supported by the output device.

7. The method of claim 1, further comprising:
determining whether the computing device is able to transform the stored content to the content quality level.

8. The method of claim 7, further comprising:
in response to determining that the computing device is unable to transform the stored content to the content quality level, notifying a user that the computing device is unable to process the request.

9. The method of claim 7, further comprising:
in response to determining that the computing device is unable to transform the stored content to the content quality level, transmitting, to a server remote from the computing device, the stored content for processing to the content quality level.

10. The method of claim 1, further comprising:
transmitting, to the rendering device, a preview image prior to beginning processing of the stored content to the content quality level.

11. The method of claim 1, further comprising:
receiving the request to display the stored content on a portion of an output device associated with the rendering device.

12. The method of claim 11, further comprising:
determining a maximum resolution of the portion of the output device.

13. The method of claim 12, wherein the determining the content quality level to transmit to the rendering device comprises:
determining the content quality level to transmit to the rendering device based on network metrics and the maximum resolution of the portion of the output device.

14. The method of claim 1, further comprising:
receiving a user selection of an output device associated with the rendering device.

15. The method of claim 1, further comprising:
determining a type of the stored content; and
automatically selecting an output device associated with the rendering device based on the type of the stored content.

16. A method comprising:
receiving, by a computing device at a first premises, a request to send content to a rendering device at the first premises;
determining if the content is stored by the computing device;
in response to determining that the content is stored remote from the computing device:
determining a remote storage device storing the content;
determining a first transmission path for the content from the remote storage device to the rendering device;
determining a first content quality level of the content to transmit to the rendering device based on the first transmission path from the remote storage device to the rendering device;
determining whether the content is pre-stored by the remote storage device in the first content quality level; and
responsive to a determination that the content is pre-stored by the remote storage device in the first content quality level, transmitting, by the computing device and to the remote storage device, an identifier of the content.

17. The method of claim 16, further comprising, in response to determining that the content is stored by the computing device:
determining a second content quality level of the content to transmit to the rendering device based on a second transmission path from the computing device to the rendering device;
processing the content according to the second content quality level to generate processed content; and
transmitting, to the rendering device via the second transmission path, the processed content.

18. The method of claim 16, further comprising, in response to determining that the content is to be generated at the first content quality level, transmitting, to a media processing device, an instruction to process the content according to the first content quality level.

19. One or more non-transitory computer readable storage media storing computer executable instructions that, when executed by a computing device, cause the computing device to:
receive user input to view a first content item on an output device associated with a rendering device;
determine whether the first content item is cached by the rendering device;
in response to determining that the first content item is cached by the rendering device, transmit an identifier of the first content item to the rendering device; and
in response to determining that the first content item is to be transmitted to the rendering device:
determine a content quality level to transmit to the rendering device based at least on a resolution configuration of the output device associated with the rendering device;
process the first content item to the content quality level to generate transformed content; and
transmit the transformed content to the rendering device.

20. The one or more non-transitory computer readable storage media of claim 19, further storing computer executable instructions that, when executed by the computing device, cause the computing device to:
    determine the content quality level to transmit to the rendering device further based on configuration settings of the output device.

\* \* \* \* \*

UNITED STATES PATENT AND TRADEMARK OFFICE
CERTIFICATE OF CORRECTION

PATENT NO. : 9,906,575 B2  
APPLICATION NO. : 14/461207  
DATED : February 27, 2018  
INVENTOR(S) : Farrell et al.

Page 1 of 1

It is certified that error appears in the above-identified patent and that said Letters Patent is hereby corrected as shown below:

In the Drawings

Sheet 3 of 5, Figure 3:  
Please insert --300--

In the Specification

Column 6, Detailed Description, Line 22:  
Delete "STBs 112," and insert --STBs 113,--

Column 10, Detailed Description, Line 17:  
Delete "322, 388," and insert --322, 330,--

Column 10, Detailed Description, Line 18:  
Delete "340." and insert --342.--

Column 10, Detailed Description, Line 18:  
Delete "314" and insert --340--

Column 14, Detailed Description, Line 67:  
Delete "325." and insert --326.--

Signed and Sealed this  
Twenty-ninth Day of January, 2019

Andrei Iancu  
*Director of the United States Patent and Trademark Office*